United States Patent
Cole

[15] 3,703,827
[45] Nov. 28, 1972

[54] TORQUE WRENCH
[72] Inventor: Judson C. Cole, Tulsa, Okla.
[73] Assignee: Continental Industries, Inc., Tulsa, Okla.
[22] Filed: Dec. 28, 1970
[21] Appl. No.: 101,972

[52] U.S. Cl. .................73/139, 116/114 R, 81/52.5
[51] Int. Cl. ...............................................G01l 5/24
[58] Field of Search .....................73/139; 81/52.5

[56] References Cited

UNITED STATES PATENTS

| 2,315,521 | 4/1943 | Hart | 73/139 |
| 2,628,497 | 2/1953 | Hart | 73/139 X |
| 2,682,796 | 7/1954 | Larson | 73/139 |
| 3,142,177 | 7/1964 | Hanscom et al. | 73/139 |

Primary Examiner—Charles A. Ruehl
Attorney—Head & Johnson

[57] ABSTRACT

A torque indicating wrench having a body block, a handle affixed to the body block, a torque arm extending from the body block and having a socket affixed to the outer end for engaging a rotatable element, a rod affixed to the body block extending generally parallel to the torque arm, and a means at said socket for retaining the outer end of the rod in a ready position wherein the rod is flexed from its normal position and for releasing the rod from the ready position when the torque applied to the torque arm causes the outer end of the torque arm to deflect away from the rod a predetermined amount.

3 Claims, 4 Drawing Figures

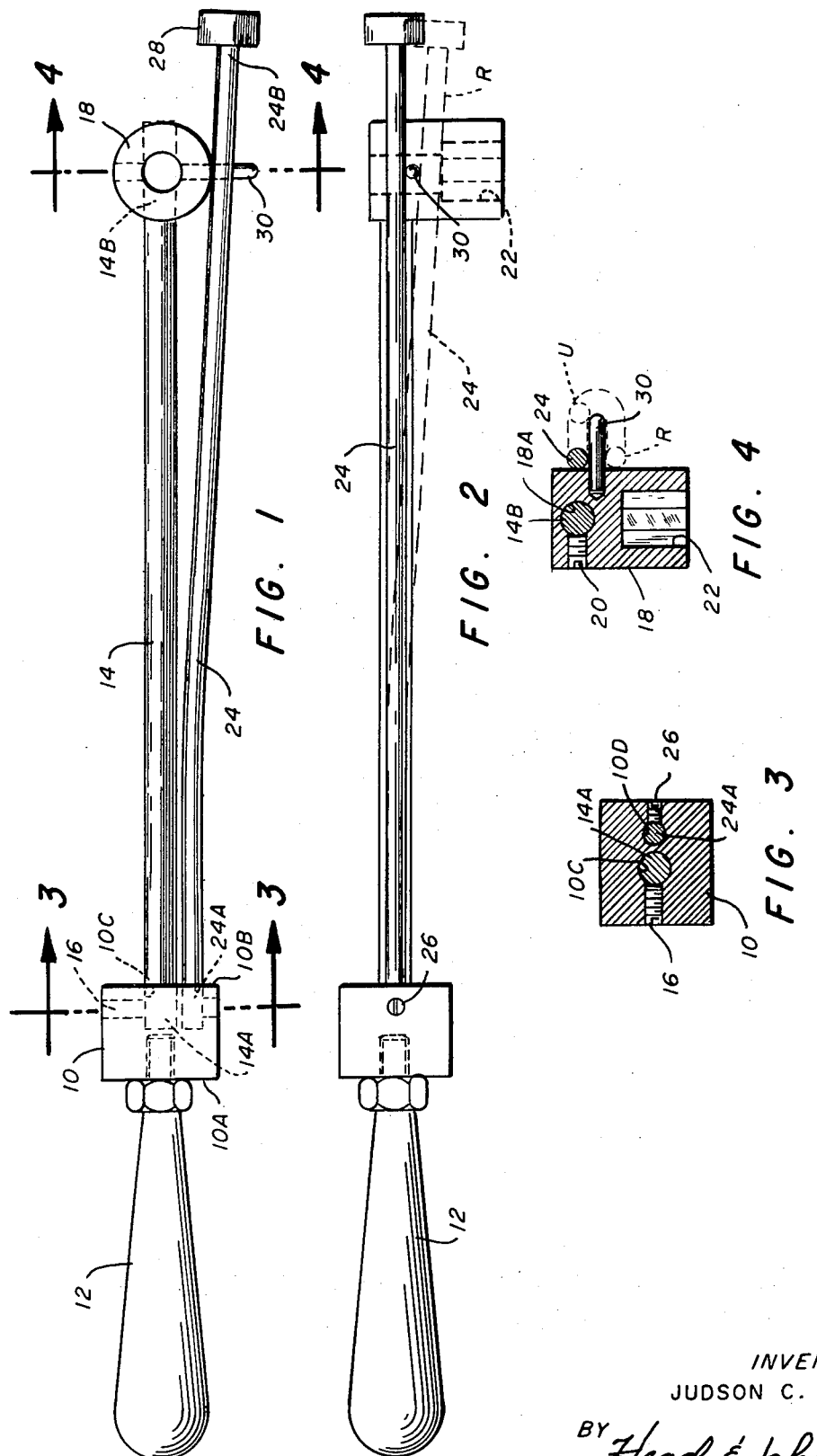

TORQUE WRENCH

BACKGROUND, SUMMARY AND OBJECTS

The use of torque indicating wrenches is well known, and normally includes a torque arm of a length and configuration such as to bend or deflect under force of torque applied at the wrench handle. At the outer end of the torque arm is a socket having means for engaging a rotatable element, such as a bolt, nut or the like. Extending from the socket, and normally parallel to the torque arm, is an indicator rod having a pointer at the inner end which points to a scale affixed adjacent the handle. The torque is indicated by the amount of deflection in the torque arm, such deflection being indicated by the pointer on the scale. Such known type of torque wrenches are designed for use to indicate torque over a given range. Such known types of torque wrenches provide only a visual indication of the torque. This invention is directed towards a torque wrench having improved means for signaling the user when a preselected amount of torque is reached. More particularly, an object of this invention is to provide a torque wrench for indicating a preselected amount of torque visually, audibly, and tactually.

These general objects, as well as more specific objects of this invention, will be fulfilled in the apparatus to be described in the following specification and claims, taken in conjunction with the attached drawings.

DESCRIPTION OF VIEWS

FIG. 1 is a top view of the torque indicating wrench of this invention.

FIG. 2 is a side view of the torque indicating wrench of this invention.

FIG. 3 is a cross-sectional view of the body block taken along the line 3—3 of FIG. 1.

FIG. 4 is a cross-sectional view of the socket portion taken along the line 4—4 of FIG. 1.

DETAILED DESCRIPTION

Referring to the drawings, the numeral 10 indicates a body block having a rearward end 10A and a forward end 10B. Affixed to the block 10 at the rearward end 10A is a handle 12.

Extending from the forward end 10B of the body block is an elongated torque arm 14. Body block 10 includes an opening 10C which receives the rearward end 14A of the torque arm. A setscrew 16 holds it in place. At the outer end 14B of the torque arm is secured to socket 18. Socket 18 includes an opening 18A which receives the outer end of the torque arm. A setscrew 20 holds the torque arm to the socket 18.

Socket 18 further includes a rotatable element receiving means 22, such as a hex socket as shown. A rotating element includes any device to be rotated by the wrench, such as a nut, bolt, or otherwise. A specific application of the invention is found in copending application entitled, "Tool For Squeezing Off Flexible Pipe," Donald J. Burke and Judson C. Cole, inventors, filed Jan. 18, 1972 serial number 107,074.

While in the illustrated arrangement the hex socket 22 is provided it can be seen that the socket 18 may as well provide a square or hex type male or female fitting or any other configuration to affix to an element to be rotated by the wrench.

Positioned adjacent and parallel to the torque arm 14 is a rod member 24 which has the inner end 24A thereof secured to the body block 10. In the illustrated arrangement an opening 10D in the body block receives the rod member inner end 24A. A setscrew 26 holds it securely to the body block.

The rod member 24 extends normally generally parallel to the torque arm 14 and contiguous to and slightly beyond socket 18. At the outer end 24B of the rod member is an indicator knob 28 which may be of any configuration desired. Affixed to the socket 18 and extending generally perpendicular to the axis of torque arm 14 is a pin 30. The rod member 24 normally extends above pin 30 as shown in solid outline in FIGS. 1, 2 and 4.

OPERATION

Preparatory to utilizing the wrench the user grasps the indicator knob 28, flexes the rod member 24 outwardly and downwardly so that the rod is positioned as shown in dotted outline indicated by the letter R in FIGS. 2 and 4. The wrench, as illustrated in the drawings, is arranged for use to indicate torque for the right-hand rotation of a rotatable element. As the handle 12 is moved clockwise and as torque is imparted by the socket element to a rotated element, increased torque will cause arm 14 to flex or bend. As arm 14 flexes, socket 18 will begin to move away from the outer end of rod 24. Rod 24 will continue to move apart from socket 18 as torque increases and arm 14 flexes until the rod reaches the outer limit of pin 30 at which time the rod 24 will spring upwardly to the position shown by the letter U in FIG. 4. Rod 24 springs upwardly because the normal plane of extension is above the pin 30 except when the rod is manually flexed downwardly beneath the pin preparatory to use of the wrench.

When the rod member 24 passes over the end of pin 30 and snaps upwardly it produces a visual indication that a preselected torque has been reached. In addition, the snap action of the upward movement of rod 24 produces an audible sound and a vibration or slight shock imparted to the handle 12 which the user will feel. Thus the wrench indicates that a given torque has been reached visually, audibly, and tactually. This means that the user does not have to keep his eyes on the wrench as it is being used but may use his visual senses to observe the other portions of the apparatus on which the wrench is being used.

The torque wrench of this invention has two basic advancements over other known types of torque wrenches. First, it provides an indication of a preselected torque level rather than indicating torque over a certain range. Second, use of the wrench does not require the workman to accurately observe a scale attached to the wrench, but enables him to ascertain when a preselected torque level is reached while keeping his eyes on other parts of the work in which he is involved.

It can be seen that the preselected torque level at which indication is given can be varied several ways. Any change in the length, cross-section or flexing characteristics of the torque arm 14 will change such preselected level. One other obvious means of changing the torque indicating level is by varying the length of pin 30.

An alternate embodiment of the invention includes the use of two or more pins 30 spaced apart, in increasing lengths, to enable the wrench to be utilized to indicate two or more preselected torque levels depending upon where the rod member 24 is set prior to usage.

While the invention has been described with a certain degree of particularity it is manifest that changes may be made in the details of construction and in the arrangement of components without departing from the spirit and scope of this disclosure. It is understood that the invention is not limited to the specific embodiments set forth herein, but is limited only by the scope of the attached claim or claims, including the full range of equivalency to which each element thereof is entitled.

What is claimed:

1. A torque indicating wrench comprising:
   a body block having a forward and rearward end;
   a handle affixed to and extending from the rearward end of said body block;
   a torque arm having a forward end and a rearward end, the rearward end being affixed to the forward end of said body block;
   a socket affixed to the torque arm forward end, the socket including rotating element attachment means;
   a rod having an inner end affixed to said body block forward end and extending generally parallel to said torque arm;
   and means at said socket for retaining the outer end of said rod in a ready position wherein the rod is flexed from its normal position, and for releasing said rod from the ready position when force applied to said handle causes said torque arm outer end to deflect away from said rod a predetermined amount.

2. A torque indicating wrench according to claim 1 wherein said means at said socket for retaining the outer end of said rod in a ready position and for releasing said rod from the ready position when the force applied to said handle causes said torque arm outer end to deflect away from said rod a predetermined amount includes:
   a retaining pin extending from said socket in a plane perpendicular the axis of said torque arm.

3. A torque indicating wrench according to claim 1 including an indicator knob affixed to the outer end of said rod.

* * * * *